United States Patent
Farrell et al.

(10) Patent No.: US 12,542,677 B2
(45) Date of Patent: Feb. 3, 2026

(54) METHOD TO SECURE IN-VEHICLE SERVICE ORIENTED ARCHITECTURE WITH MESSAGE AUTHENTICATION CODE (MAC) GENERATE ALLOW LIST (MGAL)

(71) Applicant: GM Global Technology Operations LLC, Detroit, MI (US)

(72) Inventors: Brian Farrell, Troy, MI (US); Sherif Aly, West Bloomfield, MI (US); Karl Bernard Leboeuf, LaSalle (CA); Alfred F. Adams, II, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 18/420,086

(22) Filed: Jan. 23, 2024

(65) Prior Publication Data
US 2025/0240169 A1    Jul. 24, 2025

(51) Int. Cl.
*H04L 9/32* (2006.01)
*H04L 9/08* (2006.01)
*H04L 9/40* (2022.01)

(52) U.S. Cl.
CPC .......... *H04L 9/3242* (2013.01); *H04L 9/0822* (2013.01); *H04L 9/0825* (2013.01); *H04L 63/101* (2013.01)

(58) Field of Classification Search
CPC ........ G06F 21/33; G06F 21/44; G06F 21/602; H04L 2209/84; H04L 63/0428;
(Continued)

(56) References Cited

U.S. PATENT DOCUMENTS

| 2017/0013006 A1* | 1/2017 | Ujiie ................. H04L 63/1425 |
| 2019/0080059 A1 | 3/2019 | Takumi et al. |
| 2023/0344645 A1 | 10/2023 | Iinami et al. |

FOREIGN PATENT DOCUMENTS

| DE | 102019101628 A1 | 8/2019 |
| DE | 102023120427 A1 | 6/2024 |

OTHER PUBLICATIONS

Farrell et al. "Securing In-Vehicle Service Oriented Architecture with MAC Generate Allow List Enforcement in Host Device", U.S. Appl. No. 18/459,603, filed Sep. 1, 2023.
(Continued)

*Primary Examiner* — Theodore C Parsons
(74) *Attorney, Agent, or Firm* — Honigman LLP; Matthew H. Szalach; Jonathan P. O'Brien

(57) ABSTRACT

A method for a secure in-vehicle service oriented architecture with a MAC Generate Allow List includes receiving, at a secure environment, a request to transmit a message from a device. The request to transmit includes a request for a message authentication code. The method also includes determining, based on the request to transmit, an identity of the device, and determining, based on a message authentication generate allow list, that the request to transmit does not exceed a permission level of the device. Here, the permission level of the device is stored in the message authentication generate allow list. The method also includes obtaining a secure environment key assigned to the device, the secure environment key only accessible by the secure environment, and generating the message authentication code using the secure environment key assigned to the device.

20 Claims, 7 Drawing Sheets

(58) Field of Classification Search
CPC . H04L 63/0876; H04L 63/101; H04L 63/105;
H04L 9/08; H04L 9/0822; H04L 9/0825;
H04L 9/32; H04L 9/3242; H04L 9/40;
H04W 12/67; H04W 12/69
See application file for complete search history.

(56) References Cited

OTHER PUBLICATIONS

Farrell et al. "Securing In-Vehicle Service Oriented Architecture with MAC Generate Allow List ", U.S. Appl. No. 18/073,540, filed Dec. 1, 2022.

* cited by examiner

METHOD TO SECURE IN-VEHICLE SERVICE ORIENTED ARCHITECTURE WITH MESSAGE AUTHENTICATION CODE (MAC) GENERATE ALLOW LIST (MGAL)

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a secure in-vehicle service-oriented architecture with a message authentication code (MAC) generate allow list (MGAL). Modem vehicles have seen rapid technological advancements in the number of electronics and associated software included within the vehicle. For example, electronic control units (ECUs) are used as embedded systems within the vehicle that control various electromechanical systems. However, within a service-oriented architecture (SOA), and without proper security, ECUs are susceptible to spoofing by an imposter or compromised ECU. To address this, systems may include a MAC generate allow list (MGAL) to determine whether a MAC may be generated before a message can be transmitted by an ECU. Without a valid MAC, receiving ECUs will reject the transmitted message.

SUMMARY

One aspect of the disclosure provides a computer-implemented method for securing an in-vehicle service oriented architecture with a message authentication code (MAC) generate allow list (MGAL) that when executed on data processing hardware causes the data processing hardware to perform operations that include receiving, at a secure environment, a request to transmit a message from a device, the request to transmit the message including a request for a message authentication code, and determining, based on the request to transmit the message, an identity of the device. The operations also include determining, based on a message authentication code generate allow list, that the request to transmit the message does not exceed a permission level of the identified device. Here, the permission level of the identified device is stored in the message authentication code generate allow list. The operations also include obtaining a secure environment key assigned to the identified device, the secure environment key only accessible by the secure environment, and generating the message authentication code using the secure environment key assigned to the identified device.

Implementations of the disclosure may include one or more of the following optional features. In some implementations, the device is located within a vehicle. In some examples, the message authentication code generate allow list is stored in memory hardware of the secure environment. In some implementations, the request to transmit the message further includes a message identifier (ID) indicating a level of criticality of the request to transmit. Here, the level of criticality is based on a safety impact of the request to transmit the message. In some examples, the secure environment is coupled to the device.

In some implementations, the request to transmit the message further includes a request for confidential data. In these implementations, the operations may further include receiving a public key from the device, determining, based on the message authentication code generate allow list, that the device is approved to receive the confidential data, and receiving an encrypted confidential data key, the confidential data key encrypted using the public key. Alternatively, the operations may further include determining, based on the message authentication code generate allow list, that the device is approved to receive the confidential data, receiving an encrypted confidential data key, the confidential data key encrypted using a pre-shared secret key held by the device and a remote system. Alternatively, the operations further include determining, based on the message authentication code generate allow list, that the device is approved to receive the confidential data, and receiving a secret confidential data key, the secret confidential data key used to decrypt the confidential data. The operations may optionally include determining, based on the message authentication code generate allow list, that the device is approved to receive the confidential data, establishing a secure connection with a remote system, and receiving, from the remote system, the confidential data.

Another aspect of the disclosure provides a system for securing an in-vehicle service oriented architecture with a message authentication code (MAC) generate allow list (MGAL) that includes data processing hardware and memory hardware in communication with the data processing hardware. The memory hardware stores instructions that when executed by the data processing hardware cause the data processing hardware to perform operations that include receiving, at a secure environment, a request to transmit a message from a device, the request to transmit the message including a request for a message authentication code, and determining, based on the request to transmit the message, an identity of the device. The operations also include determining, based on a message authentication code generate allow list, that the request to transmit the message does not exceed a permission level of the identified device. Here, the permission level of the identified device is stored in the message authentication code generate allow list. The operations also include obtaining a secure environment key assigned to the identified device, the secure environment key only accessible by the secure environment, and generating the message authentication code using the secure environment key assigned to the identified device.

This aspect may include one or more of the following optional features. In some implementations, the device is located within a vehicle. In some examples, the message authentication code generate allow list is stored in memory hardware of the secure environment. In some implementations, the request to transmit the message further includes a message identifier (ID) indicating a level of criticality of the request to transmit. Here, the level of criticality is based on a safety impact of the request to transmit the message. In some examples, the secure environment is coupled to the device.

In some implementations, the request to transmit the message further includes a request for confidential data. In these implementations, the operations may further include receiving a public key from the device, determining, based on the message authentication code generate allow list, that the device is approved to receive the confidential data, and receiving an encrypted confidential data key, the confidential data key encrypted using the public key. Alternatively, the operations may further include determining, based on the message authentication code generate allow list, that the device is approved to receive the confidential data, receiving an encrypted confidential data key, the confidential data key encrypted using a pre-shared secret key held by the device and a remote system. Alternatively, the operations further include determining, based on the message authentication code generate allow list, that the device is approved to receive the confidential data, and receiving a secret confidential data key, the secret confidential data key used to decrypt the confidential data. The operations may optionally include determining, based on the message authentication code generate allow list, that the device is approved to receive the confidential data, establishing a secure connection with a remote system, and receiving, from the remote system, the confidential data.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
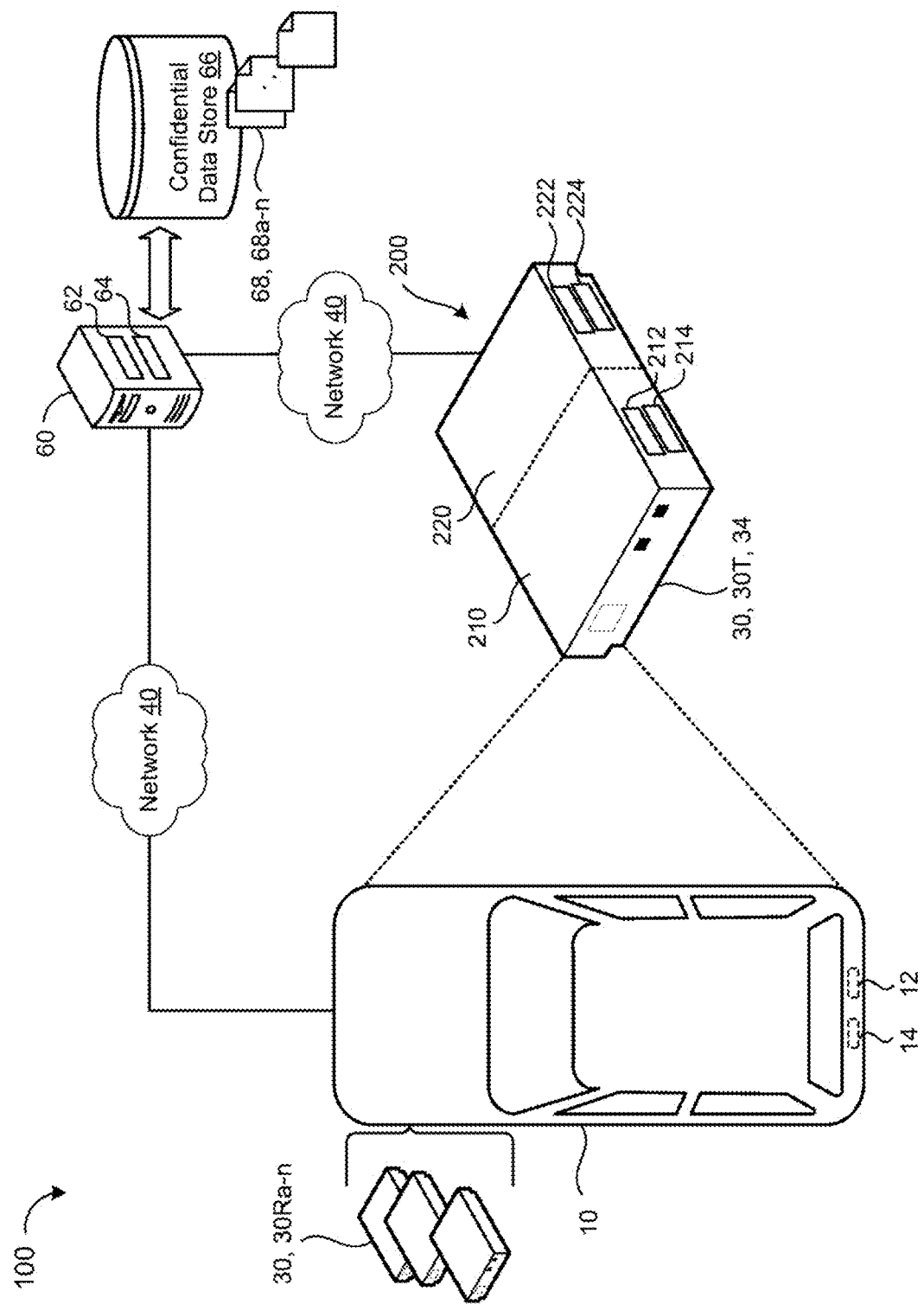
FIG. 1 is a schematic view of an example system for a secure in-vehicle service oriented architecture with a MAC Generate Allow List (MGAL).

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Historically, the development of vehicles took a data intensive approach in which the vehicle's mains sensors produced voluminous data, which was transmitted to every single electronic control unit (ECU) within the vehicle. In other words, sensor data was blindly sent between every single ECU regardless of whether it had changed or was relevant to the receiving ECU. Moreover, the data was sent regardless of whether other ECUs were subscribed and/or present on a network of the vehicle.

By contrast, in a service-oriented architecture (SOA), an ECU only transmits data when at least one ECU on the network needs it. Moreover, third-party applications may be installed in the vehicle and used in conjunction with the various ECUs that are present. As such, it is important to ensure that those applications are not able to thwart existing security protocols and spoof, for example, the ECUs required for braking in order to prevent braking action by a driver of the vehicle. Because ECUs in modern vehicles range from controlling the engine, the airbags, the brakes, and any other critical system functions, preventing inadvertent or nefarious instructions to an ECU can avoid anything from innocuous to dangerous results. For example, the permissions for an acceleration ECU to accelerate the vehicle are critical to prevent potentially dangerous consequences. As such, ensuring that instructions and/or messages are only issued from an ECU properly authorized to send the messages, and that the message does not exceed the permissions of the particular ECU, is essential to the security of the SOA.

To combat this, each ECU generally includes its own secret key to ensure that other ECUs cannot spoof each other. In existing designs, the ECUs are pre-populated with information about the identities and secret keys of each ECU. Here, the receiving ECU verifies the ECU message received from a transmitting ECU by checking where the request came from and what permissions the transmitting ECU has. Thus, when an ECU requests to transmit a message, a hardware security module (e.g., a secure environment) internal to the requesting ECU identifies whether the requesting ECU is using a secret key belonging to it. As such, the hardware security module will not generate a message authentication code (MAC) for an ECU that is not using its assigned secret key. Notably, in these configurations, the source ECU of each message is required to be known in advance by each ECU. However if a message sent by an ECU moves to another ECU or permissions change, all of the ECUs receiving that message have to be updated. In contrast, self-policing MAC generation within the ECU allows any changes to locations or permissions to the ECU to be updated locally.

Moreover, recent designs may take a blunt approach to generating a MAC for an ECU. For example, a secure entity may only determine whether the particular ECU can or cannot perform a service. However, with reference to a receiving ECU (e.g., a braking module), a first transmitting ECU may need to send low criticality messages (e.g., clearing a brake status indicator), while a second transmitting ECU may need to send a high criticality message (e.g., applying the brakes). Applying granularity within decisions to generate the MAC by self-policing the ECU not only increases the flexibility of the SOA, but allows an opportunity to increase the protection of transmitted critical data by defining ECU permission levels within the self-policing system. Moreover, defining permissions with granularity with the decisions to generate the MAC allows, for example, a quality managed client ECU to subscribe to another ECU for quality managed messages, but not for safety rated messages.

FIG. 1 illustrates an example system 100 including a vehicle 10 and/or a remote system 60 in communication with the vehicle 10 via a network 40. The vehicle 10 and/or the remote system 60 include one or more devices 30 (also referred to as an electronic control unit (ECU) 30) that execute a secure in-vehicle SOA with a message authentication code (MAC) generate allow list (MGAL) system 200 (also referred to as the MGAL system 200). In particular, the vehicle 10 includes a transmitting device 30T in communication with a plurality of receiving devices 30R, 32a-n via the network 40. The network 40 may operate as an in-vehicle network 40 that facilitates the communication between the devices 30 within the vehicle 10. Optionally, the vehicle 10 may include an in-vehicle network that is separate from the network 40, where, the devices 30 communicate via the separate in-vehicle network.

In the example shown, the device 30 includes a host 210 and a secure environment 220. The secure environment 220 of the device 30 executes the MGAL system 200 (FIGS. 2-3D) that self-polices transmissions from the host 210 of the device 30 based on granular permissions of the device 30 stored within a MAC generate allow list (MGAL) 232. In particular, in response to receiving a request to transmit 216 a message from the host 210, the MGAL system 200 ensures, via the secure environment 220, that the secret key 234 (also referred to as the MAC generate key 234) for the transmitting device 30T cannot be used to generate a MAC 218 for messages that are higher criticality than the transmitting device 30T is permitted to transmit. Put differently, rather than the transmitting device 30T communicating with an external system to obtain a MAC 218 for a message, the secure environment 220 of the transmitting device 30T self-polices the transmitting device 30T via the MGAL system 200. Moreover, by self-policing, the MGAL system 200 provides the benefit of not requiring all of the receiving devices 30R to determine whether a message/request came from a verified transmitting device 30T and whether the transmitting device 30T is authorized (i.e., has a proper permission level 280) to send the message.

Notably, and as will be described in further detail below, each of the devices 30 performs respective operations, where each device 30 may perform multiple operations with distinct criticalities, and may operate as both a transmitting device 30T and a receiving device 30R. For example, a receiving device 30R may include a brake ECU that has multiple operations including a low criticality operation such as clearing a brake status indicator, and a high criticality operation such as applying the brakes. In this example, the transmitting device 30T may have permission to request a transmission to the receiving device 30R for the low criticality operation (e.g., clearing a status indicator), but the transmitting device 30T may not have permission to request a transmission to the receiving device 30R for the high criticality operation (i.e., applying the brakes). By defining permissions at the operations level, the MGAL system 200 follows a principle of least privilege where a device 30 is only given access to the level of operations it truly needs for a particular device 30.

In the example shown, the device 30 executing the MGAL system 200 is disposed within the vehicle 10. However, the MGAL system 200 can be implemented on other devices (e.g., computing devices in communication with the device 30), such as, without limitation, a smart phone, tablet, smart display, or a vehicle infotainment device. The device 30 may communicate with each of the other devices 30 using standard communications technologies and/or protocols. Thus, the network 40 can include Wireless Fidelity (WiFi®) (e.g., 802.11), worldwide interoperability for microwave access (WiMAX), 3G, 4G, Long Term Evolution (LTE), 5G, digital subscriber line (DSL), Bluetooth®, Near Field Communication (NFC), or any other wireless standards. The vehicle 10 may include one or more access points (AP) (not shown) configured to facilitate wireless communication between the device 30 and one or more of the other devices 30.

As shown in FIG. 1, the vehicle 10 includes data processing hardware 12 and memory hardware 14 storing instructions that when executed on the data processing hardware 12 cause the data processing hardware 12 to perform operations. The remote system 60 (e.g., server, cloud computing environment) also includes data processing hardware 62 and memory hardware 64 storing instructions that when executed on the data processing hardware 62 cause the data processing hardware 62 to perform operations. A confidential data store 66 may be overlain on the memory hardware 64 of the remote system 60 and is configured to store a corpus of confidential data 68, 68a-n associated with the devices 30. Additionally or alternatively, the confidential data store 66 may be stored within the memory hardware 14 of the vehicle 10 or memory hardware 224 of each respective device 30.

Additionally, the host 210 includes data processing hardware 212 and memory hardware 214 storing instructions that when executed on the data processing hardware 212 cause the data processing hardware 212 to perform operations. For example, when the device 30 is an ECU, the host 210 may execute the relevant tasks needed under the circumstances, as well as most or all of the application software for the ECU. The secure environment 220 includes data processing hardware 222 and memory hardware 224 storing instructions that when executed on the data processing hardware 222 cause the data processing hardware 222 to perform operations. The memory hardware 224 of the secure environment 220 includes a relatively small amount of executable code for executing on the data processing hardware 222 for performing the security-critical functions such as generating security messages, managing keys, and so forth. While the secure environment 220 is shown physically collocated with the host 210 within the device 30, it should be appreciated that the secure environment 220 may be coupled to and/or in wireless communication with the device 30.

Figure 2:
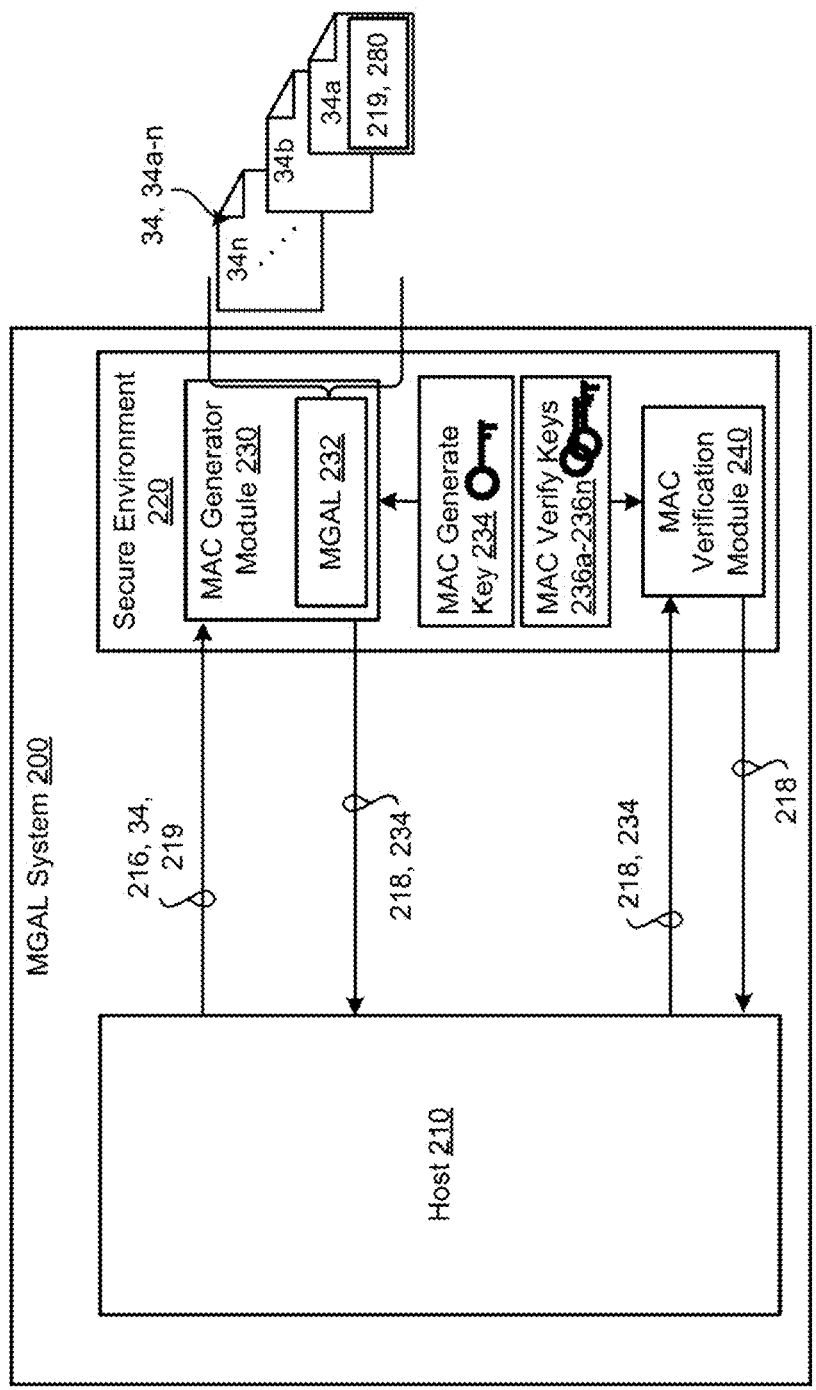
FIG. 2 is a schematic view of example components of the system of FIG. 1.

With reference to FIGS. 1 and 2, the MGAL system 200 of the device 30 is shown and includes the host 210 in communication with the secure environment 220. The secure environment 220 includes a MAC generator module 230 that includes the MGAL 232 and has access to the MAC generate key 234 for the device 30, and a MAC verification module 240 that has access to the MAC verify keys 236, 236a-n. The MAC generate key 234 and the MAC verify keys 236 are securely stored within the memory hardware 224 of the secure environment 220 and, in some configurations, are stored within the MAC generator module 230 and the MAC verification module 240, respectively. Notably, the MAC generate key 234 for the device 30 is only accessible by the secure environment 220, and is not accessible by the host 210 or any third-party applications running on or in communication with the host 210.

The MGAL 232 is stored within the memory hardware 224 of the secure environment 220 and includes, for each device 30, one or more method IDs 219 and corresponding permission levels 280 for each service that the device 30 will use to perform operations (i.e., method calls) within the MGAL system 200. In the example shown in FIG. 2, the MGAL 232 may sort the method IDs 219 for each service that the device 30 performs and corresponding permissions 280 based on the identity 34 of each device 30. However, it should be appreciated that the permission levels 280 for each device 30 may be organized in any number of ways, such as, based on the level of criticality (i.e., the method ID 219) of the permission 280 rather than an identity 34 of the device 30. For example, for each device 30 listed in the MGAL 232, the MGAL 232 may include a list of services (i.e., other devices 30) and a corresponding highest permission level for the respective service. In some implementations, permission levels are tied to a level of criticality based on a safety impact of the request to transmit 216 the message. Here, a higher permission level may correspond to a request to transmit 216 that impacts a safety aspect of the vehicle 10 (e.g., brakes, acceleration), while a lower permission level may correspond a request to transmit 216 that relates to a quality aspect of the vehicle 10 (e.g., brake wear indicator, low wiper fluid indicator). For example, a brake module device 30 may be the only device 30 that has a permission level 280 to apply the brakes in the vehicle 10. As such, any device 30 other than the brake module device 30 that sends a request to transmit 216 a message to apply the brakes will be denied a MAC by its own secure environment 220 for failing to have the permission level 280 to apply the brakes.

When the host 210 of the device 30 wishes to transmit a message, it sends a request to transmit 216 the message to the secure environment 220. The request to transmit 216 includes a request for a MAC 218, and may further include MAC data such as a method ID 219, type of data transmitted, etc. As described above, in order to transmit a message, the secure environment 220 first verifies whether the request to transmit 216 the message does not exceed the permissions of the device 30 stored in the MGAL 232. For example, the request to transmit 216 the message may further include the identity 34 of the device 30 that uniquely identifies the device 30 such that the secure environment 220 may determine, based on the request to transmit 216 the message, the identity 34 of the device 30. Further, the request to transmit may include the method ID 219 identifying the type of service/operation requested by the request to transmit 216. In some implementations, the method ID 219 indicates a level of criticality of the request to transmit 216 the message, where the level of criticality is based on a safety impact of the request to transmit 216 the message.

The secure environment 220 of the transmitting device 30T determines, based on the MGAL 232, whether the request to transmit 216 the message exceeds a permission level 280 of the identified device 30. For example, the MAC generator module 230 identifies the permission levels 280 of the identified device 30 based on the service represented by the method ID 219 included in the request to transmit 216 stored in the MGAL 232. The MAC generator module 230 may compare the level of criticality indicated by the method ID 219 included in the request to transmit 216 to the permission level 280 of the service providing the method call stored in the MGAL 232 for the transmitting device 30T. When the request to transmit 216 the message does not exceed the permission level 280 of the identified device 30, the MAC generator module 230 may retrieve the MAC generate key 234 assigned to the identified device 30, and generate the MAC 218 using the MAC generate key 234 assigned to the identified device 30. Conversely, when the request to transmit 216 the message exceeds the permission level 280 of the identified device 30, the secure environment 220 rejects the request to transmit 216.

With continued reference to FIG. 2, when the host 210 receives a message including a MAC 218, it may send the MAC 218 to the secure environment 220 to verify the authenticity of the message. Here, the MAC verification module 240 receives the MAC 218 and any additional MAC verify data to determine whether the received MAC 218 was derived from an authentic key. For example, the MAC verify data may include a key serial number of the MAC generate key 234. The MAC verification module 240 may compare the key serial number of the MAC generate key 234 used to generate the MAC 218 to the MAC verify keys 236. When the MAC verification module 240 confirms that the MAC 218 is authentic, it may indicate to the host 210 that the MAC 218 is verified. Conversely, when the MAC verification module 240 identifies that the MAC 218 represents a spoof, it rejects the message and discards the MAC 218. Additionally, the MAC verification module 240 may indicate to the host 210 that MAC 218 is not verified.

In some implementations, the request to transmit 216 the message further includes a request for confidential data 68. Here, the MGAL system 200 may further execute a confidential transmission of the confidential data 68 via the secure environment 220. Referring to FIGS. 3A-3D, example systems 300, 300a-d where the request to transmit 216 the message further includes a request for confidential data 68 are shown. In these implementations, in addition to verifying that the request to transmit 216 the message does not exceed the permission level 280 of the identified device 30, the secure environment 220 further determines whether the device 30 is approved to receive the confidential data 68. Here, the method ID 219 included in the request to transmit 216 may further indicate that the request to transmit 216 includes a request for confidential data 68. Based on the permissions 280 in the MGAL 232, the secure environment 220 may determine whether the device 30 is approved to receive confidential data 68, and when the secure environment 220 determines, based on the MGAL 232, that the device 30 is approved to receive the confidential data 68, it may take additional steps to protect the confidential data 68. While the following systems 300a-300d generally refer to a transmitting device 30T in communication with the server 60, it should be appreciated that these implementations may be between a transmitting device 30T and a receiving device 30R within the vehicle 10, where the receiving device 30R stores confidential data 68 that the transmitting device 30T is requesting. Optionally, the secure environment 330 of the receiving device 30R verifies the request to transmit 216 including the request for confidential data 68 by first verifying the MAC 218 on the request to transmit 216 received from the transmitting device 30T.

Figure 3A:
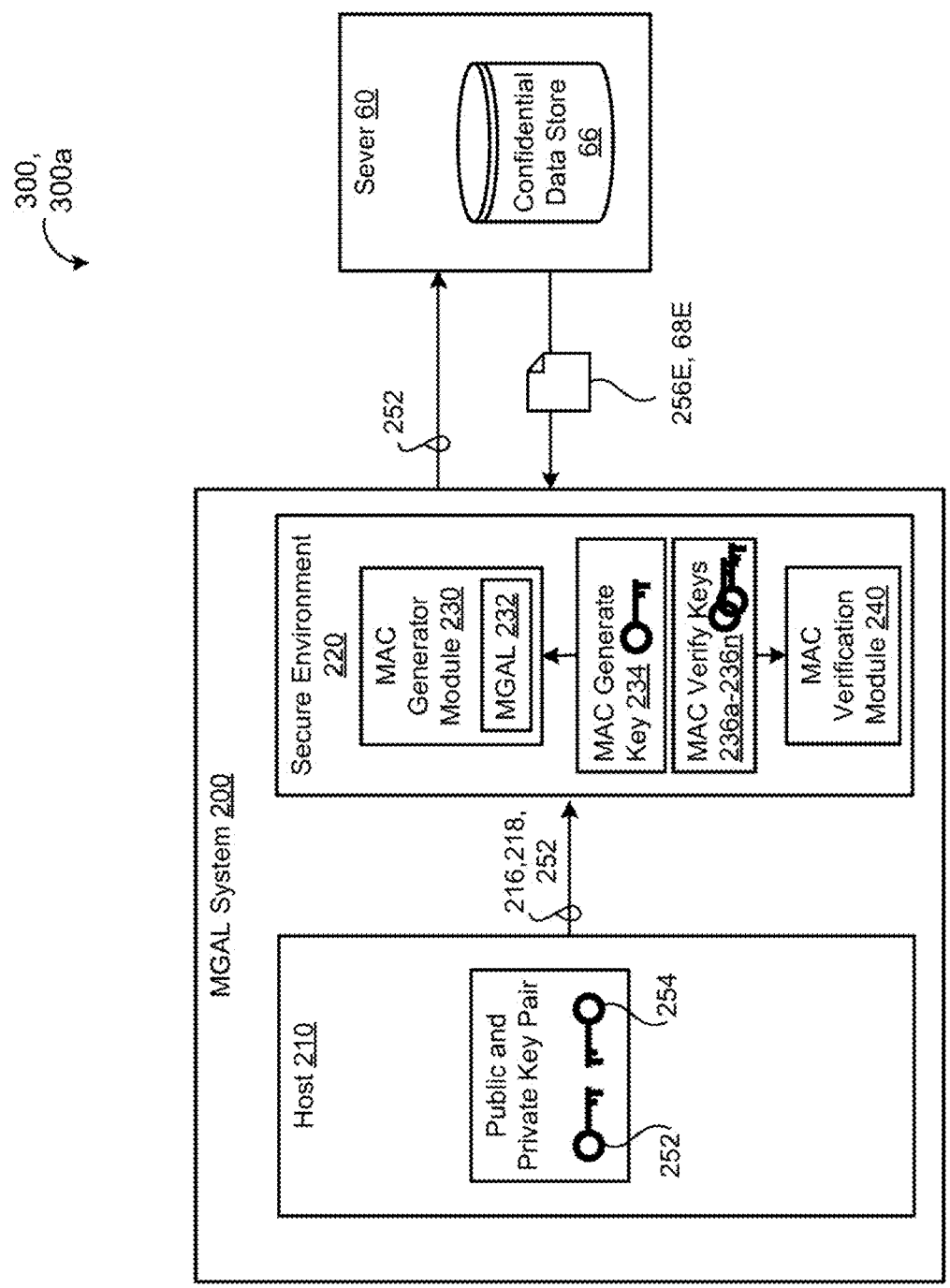
FIGS. 3A-3D are schematic views of example components of the system of FIG. 1 for transmitting confidential data.

With particular reference to FIG. 3A, the example system 300a shows the host 210 including a public-private asymmetric key pair that includes a public key 252 and a private key 254. Here, concurrently with the request to transmit 216 including the MAC 218 and the request for confidential data 68, or shortly thereafter, the secure environment 220 receives the public key 254 from the host 210. The secure environment 220 determines, based on the MGAL 232, that the device 30 is approved to receive the confidential data 68. Here, the remote system 60 may authenticate the public key 252 and then use the public key 252 received from the host 210 to encrypt a confidential data key 256 before sending the encrypted confidential data 68E and the encrypted confidential data key 256E to the host 210. When the host 210 receives the encrypted confidential data key 256E and the encrypted confidential data 68E, it may use the private key 254 to decrypt the encrypted confidential data key 256E in order to decrypt the encrypted confidential data 68E to access the plaintext confidential data 68.

Figure 3B:
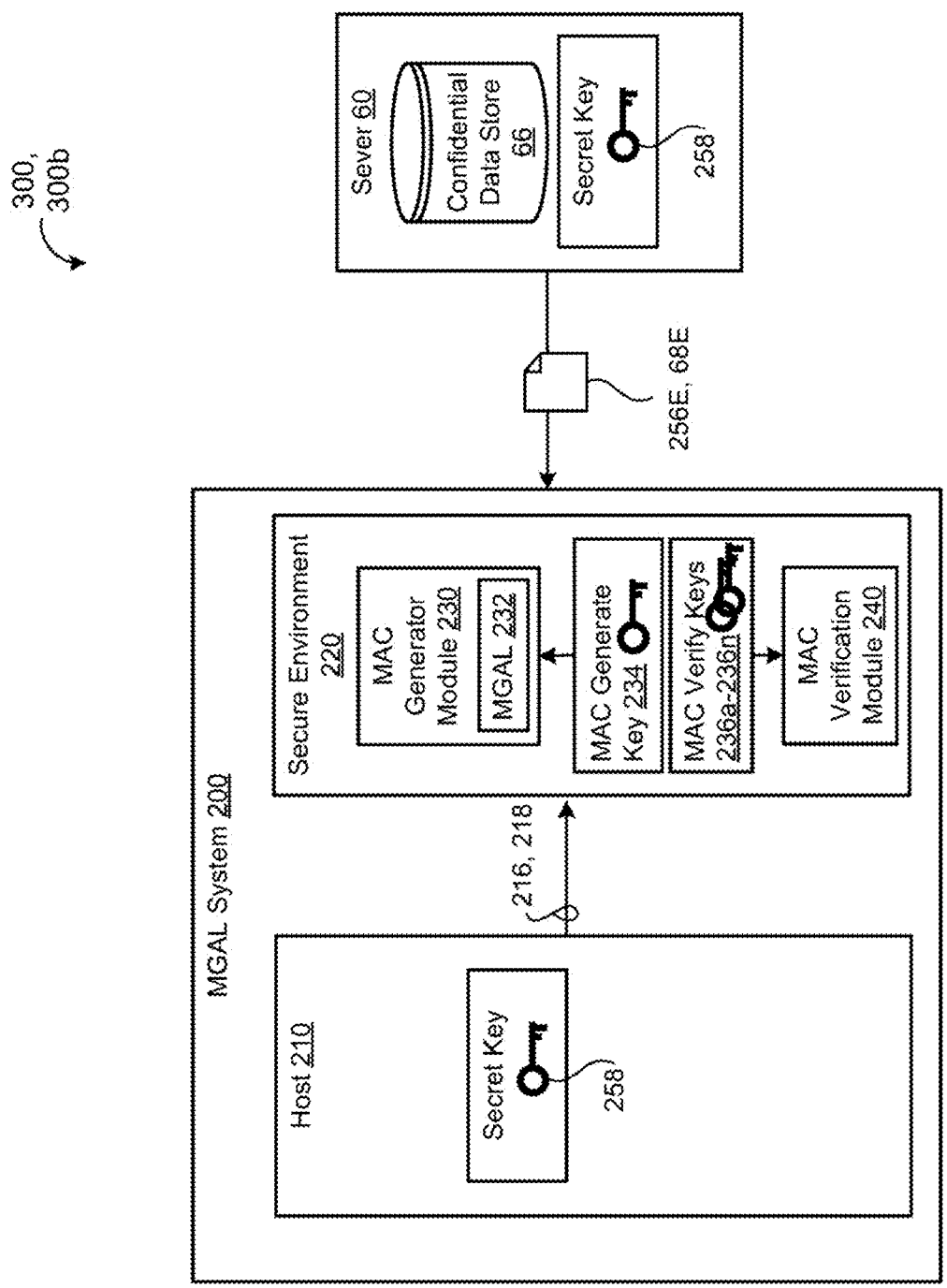

With reference to FIG. 3B, the example system 300b shows the host 210 and the remote system 60 each including a secret key 258. The secret key 258 may be pre-shared during assembly of the vehicle 10. Here, after receiving the request to transmit 216 including the request for confidential data 68, the secure environment 220 determines, based on the MGAL 232, that the device 30 is approved to receive the confidential data 68. The remote device 60 and/or the secure environment 220 may acknowledge the request for confidential data 68, and use the pre-shared secret key 258 to encrypt a confidential data key 256 before sending the encrypted confidential data 68E and the encrypted confidential data key 256E to the host 210. When the host 210 receives the encrypted confidential data key 256E and the encrypted confidential data 68E, it may use the pre-shared secret key 258 to decrypt the encrypted confidential data key 256E in order to decrypt the encrypted confidential data 68E to access the plaintext confidential data 68.

Figure 3C:
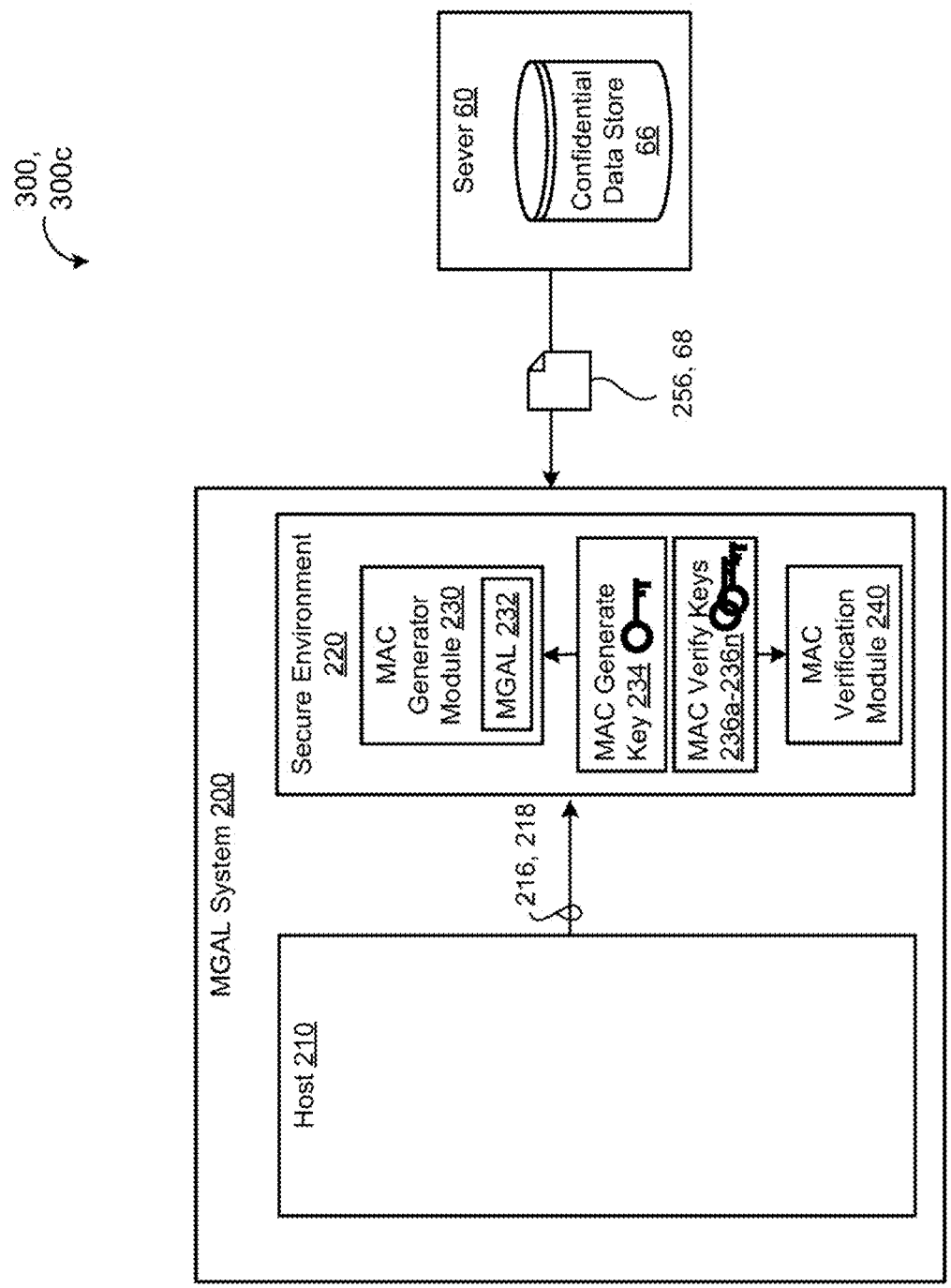

Referring to FIG. 3C, the example system 300c may include instances where it is acceptable to expose the confidential data key 256 for a limited time to limited devices 30. Here, after receiving the request to transmit 216 including the MAC 218 and the request for confidential data 68, the secure environment 220 determines, based on the MGAL 232, that the device 30 is approved to receive the confidential data 68. Thereafter, the MGAL system 200 receives, from the remote system 60, the secret confidential data key, and decrypts the encrypted confidential data 68E to access the plaintext confidential data 68.

Figure 3D:
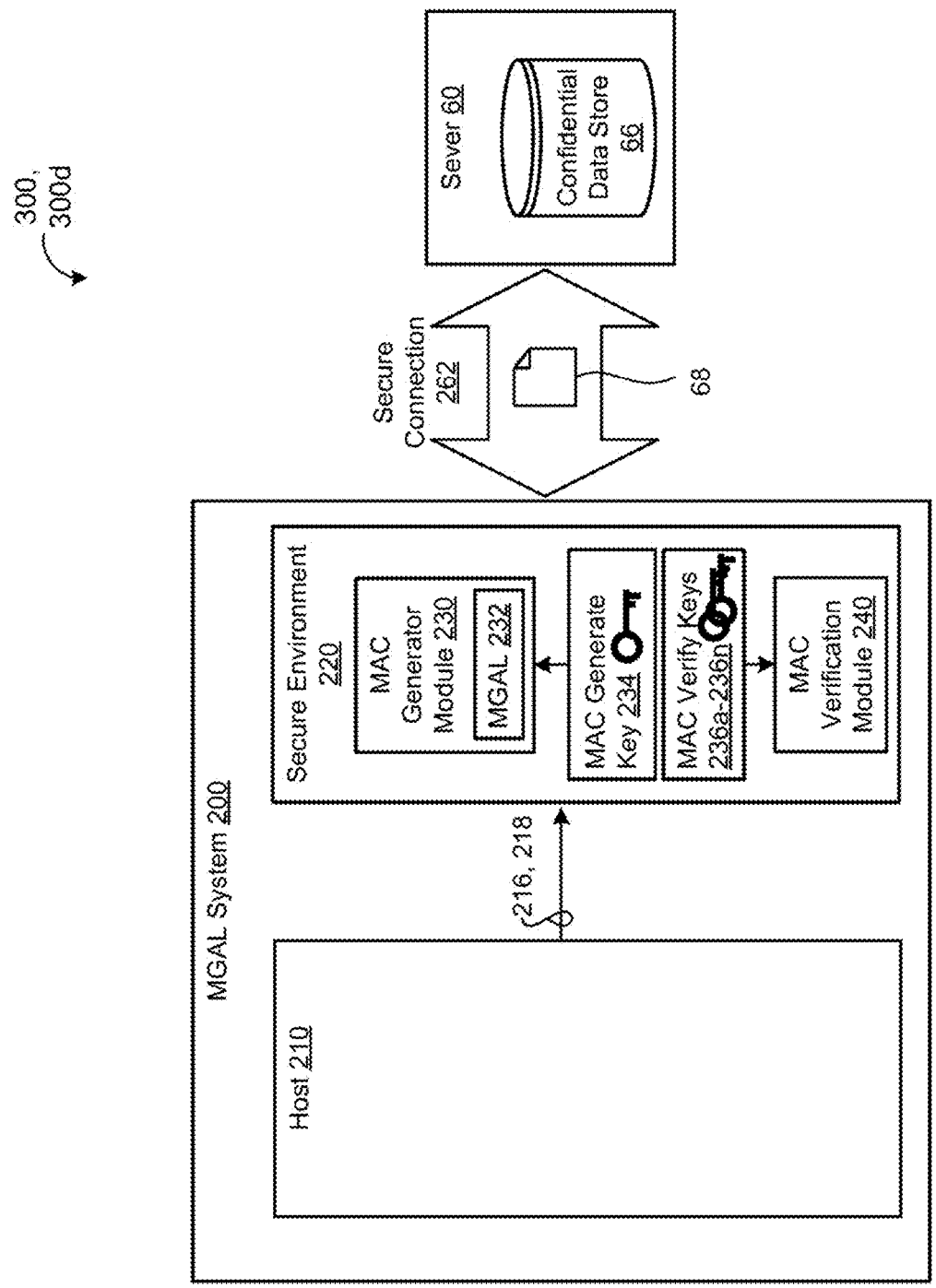

Referring to FIG. 3D, the example system 300d may include instances where a secure connection 262 can be established between the secure environment 220 and the remote system 60. For example, the secure connection 262 could include a virtual local area network (VLAN) that establishes a private communication channel that does not expose the confidential data 68 in an unacceptable way. In these implementations, after receiving the request to transmit 216 including the request for confidential data 68, the secure environment 220 determines, based on the MGAL 232, that the device 30 is approved to receive the confidential data 68. Thereafter, the MGAL system 200 establishes the secure connection 262 with the remote system 60 and receives, from the remote system 60, the confidential data 68.

Figure 4:
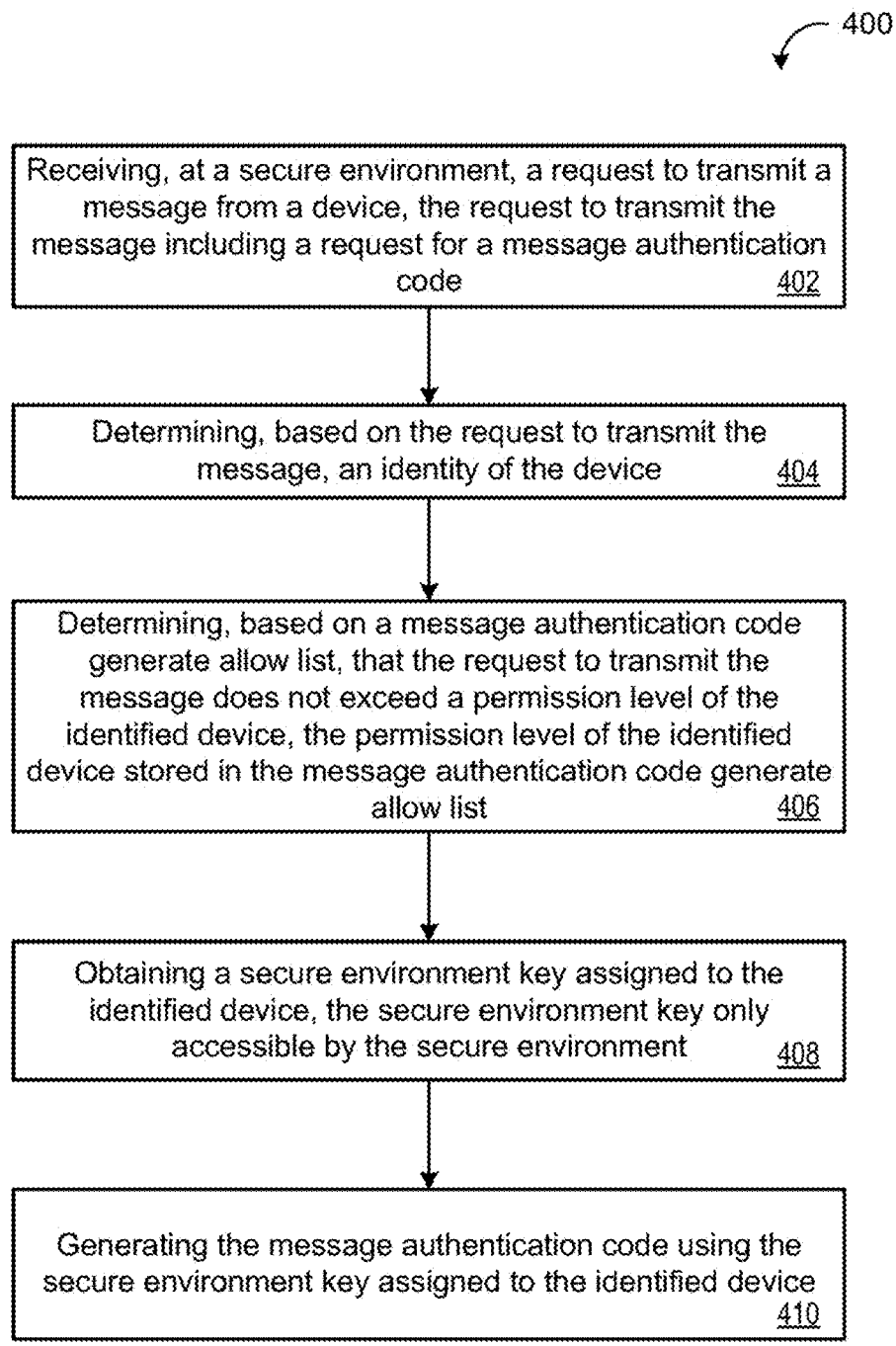
FIG. 4 is a flowchart of an example arrangement of operations for a method for a secure in-vehicle service oriented architecture with a MAC Generate Allow List (MGAL).

FIG. 4 includes a flowchart of an example arrangement of operations for a method 400 for a secure in-vehicle service oriented architecture with a message authentication code (MAC) Generate Allow List (MGAL) 232. Data processing hardware (e.g., data processing hardware 212, 222, 62 of FIG. 1) may execute instructions stored on memory hardware (e.g., memory hardware 214, 224, 64 of FIG. 1) to perform the example arrangement of operations for the method 400. At operation 402, the method 400 includes receiving, at a secure environment 220, a request to transmit 216 a message from a device 200, the request to transmit 216 the message including a request for a message authentication code 218. At operation 404, the method 400 also includes determining, based on the request to transmit 216 the message, an identity 34 of the device 200.

The method 400 also includes, at operation 406, determining, based on a message authentication code generate allow list (MGAL) 232, that the request to transmit 216 the message does not exceed a permission level 280 of the identified device 200. Here, the permission level 280 of the identified device 200 corresponds to a method ID 219 of the service being requested and is stored in the MGAL 232. At operation 408, the method 400 further includes obtaining a secure environment key 234 (also referred to as a MAC generate key 234). The secure environment key 234 is only accessible by the secure environment 220. At operation 410, the method 400 also includes generating the message authentication code 218 using the secure environment key 234 assigned to the identified device 200.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed on data processing hardware causes the data processing hardware to perform operations comprising:
   receiving, at a secure environment, a request to transmit a message from a device, the request to transmit the message including a request for a message authentication code;
   determining, based on the request to transmit the message, an identity of the device;

determining, based on a message authentication code generate allow list, that the request to transmit the message does not exceed a permission level of the identified device, the permission level of the identified device stored in the message authentication code generate allow list;

obtaining a secure environment key assigned to the identified device, the secure environment key only accessible by the secure environment; and generating the message authentication code using the secure environment key assigned to the identified device.

2. The method of claim 1, wherein the device is located within a vehicle.

3. The method of claim 1, wherein the message authentication code generate allow list is stored in memory hardware of the secure environment.

4. The method of claim 1, wherein the request to transmit the message further includes a message identifier (ID) indicating a level of criticality of the request to transmit, the level of criticality based on a safety impact of the request to transmit the message.

5. The method of claim 1, wherein the secure environment is coupled to the device.

6. The method of claim 1, wherein the request to transmit the message further includes a request for confidential data.

7. The method of claim 6, wherein the operations further include:

receiving a public key from the device;

determining, based on the message authentication code generate allow list, that the device is approved to receive the confidential data; and receiving an encrypted confidential data key, the confidential data key encrypted using the public key.

8. The method of claim 6, wherein the operations further include:

determining, based on the message authentication code generate allow list, that the device is approved to receive the confidential data; and receiving an encrypted confidential data key, the confidential data key encrypted using a pre-shared secret key held by the device and a remote system.

9. The method of claim 6, wherein the operations further include:

determining, based on the message authentication code generate allow list, that the device is approved to receive the confidential data; and receiving a secret confidential data key, the secret confidential data key used to decrypt the confidential data.

10. The method of claim 6, wherein the operations further include:

determining, based on the message authentication code generate allow list, that the device is approved to receive the confidential data;

establishing a secure connection with a remote system; and receiving, from the remote system, the confidential data.

11. A system comprising:

data processing hardware associated with a secure environment; and memory hardware associated with the secure environment and in communication with the data processing hardware, the memory hardware storing instructions that when executed on the data processing hardware cause the data processing hardware to perform operations comprising:

receiving, at the secure environment, a request to transmit a message from a device, the request to transmit the message including a request for a message authentication code;

determining, based on the request to transmit the message, an identity of the device;

determining, based on a message authentication code generate allow list, that the request to transmit the message does not exceed a permission level of the identified device, the permission level of the identified device stored in the message authentication code generate allow list;

obtaining a secure environment key assigned to the identified device, the secure environment key only accessible by the secure environment; and generating the message authentication code using the secure environment key assigned to the identified device.

12. The system of claim 11, wherein the device is located within a vehicle.

13. The system of claim 11, wherein the message authentication code generate allow list is stored in the memory hardware of the secure environment.

14. The system of claim 11, wherein the request to transmit the message further includes a method identifier (ID) indicating a level of criticality of the request to transmit, the level of criticality based on a safety impact of the request to transmit the message.

15. The system of claim 11, wherein the secure environment is coupled to the device.

16. The system of claim 11, wherein the request to transmit the message further includes a request for confidential data.

17. The system of claim 16, wherein the operations further include:

receiving a public key from the device;

determining, based on the message authentication code generate allow list, that the device is approved to receive the confidential data; and receiving an encrypted confidential data key, the confidential data key encrypted using the public key.

18. The system of claim 16, wherein the operations further include:

determining, based on the message authentication code generate allow list, that the device is approved to receive the confidential data; and receiving an encrypted confidential data key, the confidential data key encrypted using a pre-shared secret key held by the device and a remote system.

19. The system of claim 16, wherein the operations further include:

determining, based on the message authentication code generate allow list, that the device is approved to receive the confidential data; and receiving a secret confidential data key, the secret confidential data key used to decrypt the confidential data.

20. The system of claim 16, wherein the operations further include:

determining, based on the message authentication code generate allow list, that the device is approved to receive the confidential data;

establishing a secure connection with a remote system; and receiving, from the remote system, the confidential data.

* * * * *